United States Patent
Athalye et al.

(10) Patent No.: US 10,240,727 B2
(45) Date of Patent: Mar. 26, 2019

(54) INLINE DRIVER MODULE FOR SSL LIGHTING

(71) Applicant: Ecoled Ventures Limited, Tsimshatsui, Kowloon (HK)

(72) Inventors: Praneet Jayant Athalye, Morrisville, NC (US); Frederic Perry Phillips, Wuzhong District (CN); Christopher Lee Whitworth, Mooresville, NC (US); Ashok Deepak Shah, Atlanta, GA (US)

(73) Assignee: EPISTAR CORPORATION, Hsinchu (TW)

( * ) Notice: Subject to any disclaimer, the term of this patent is extended or adjusted under 35 U.S.C. 154(b) by 0 days.

(21) Appl. No.: 15/496,845

(22) Filed: Apr. 25, 2017

(65) Prior Publication Data

US 2017/0311399 A1    Oct. 26, 2017

Related U.S. Application Data

(60) Provisional application No. 62/327,221, filed on Apr. 25, 2016.

(51) Int. Cl.
*F21K 9/68*        (2016.01)
*F21K 9/235*       (2016.01)
(Continued)

(52) U.S. Cl.
CPC ............... *F21K 9/68* (2016.08); *F21K 9/20* (2016.08); *F21K 9/235* (2016.08); *F21K 9/237* (2016.08);
(Continued)

(58) Field of Classification Search
CPC ..... F21K 9/68; F21K 9/69; F21K 9/90; F21K 9/20; F21K 9/235; F21K 9/237; F21V 7/041; F21V 7/06; F21V 23/006; F21V 23/009; F21V 23/005; F21V 23/045; F21V 13/04; F21V 5/048; F21V 5/04;
(Continued)

(56) References Cited

U.S. PATENT DOCUMENTS

2004/0264187 A1* 12/2004 Vanderschuit .......... F21S 6/005
                                                            362/235
2009/0284155 A1* 11/2009 Reed .................... F21V 23/0442
                                                            315/32

(Continued)

*Primary Examiner* — David V Bruce
(74) *Attorney, Agent, or Firm* — Patterson + Sheridan, LLP

(57) ABSTRACT

An inline driver module includes an input connector, the input connector comprising a live contact and a neutral contact, the live contact configured to connect to a live line of an AC power socket, the neutral contact configured to connect to a neutral line of the AC power socket; an output connector, the output connector comprising a positive contact and a negative contact; and a driver module, the driver module disposed between the input connector and the output connector, the driver module comprising a driver housing and a driver PCB, a driver housing cavity defined within the driver housing, the driver PCB disposed within the driver housing cavity, the driver PCB connected in electrical communication with the live contact, the neutral contact, the positive contact, and the negative contact, the driver PCB configured to convert an AC power input from the AC power socket to a DC power output.

19 Claims, 6 Drawing Sheets

(51) Int. Cl.
| | |
|---|---|
| *F21K 9/69* | (2016.01) |
| *F21K 9/237* | (2016.01) |
| *F21K 9/90* | (2016.01) |
| *F21S 8/02* | (2006.01) |
| *F21V 5/04* | (2006.01) |
| *F21V 7/04* | (2006.01) |
| *F21V 13/04* | (2006.01) |
| *F21V 21/04* | (2006.01) |
| *F21V 23/00* | (2015.01) |
| *H02G 3/16* | (2006.01) |
| *H02G 3/20* | (2006.01) |
| *F21K 9/20* | (2016.01) |
| *F21V 7/06* | (2006.01) |
| *F21V 17/00* | (2006.01) |
| *H02G 3/12* | (2006.01) |
| *F21V 23/04* | (2006.01) |
| *F21Y 115/10* | (2016.01) |
| *F21Y 115/15* | (2016.01) |

(52) U.S. Cl.
CPC .................. *F21K 9/69* (2016.08); *F21K 9/90* (2013.01); *F21S 8/026* (2013.01); *F21V 5/048* (2013.01); *F21V 7/041* (2013.01); *F21V 13/04* (2013.01); *F21V 21/04* (2013.01); *F21V 23/005* (2013.01); *F21V 23/006* (2013.01); *F21V 23/009* (2013.01); *H02G 3/16* (2013.01); *H02G 3/20* (2013.01); *F21V 5/04* (2013.01); *F21V 7/06* (2013.01); *F21V 17/007* (2013.01); *F21V 21/042* (2013.01); *F21V 23/045* (2013.01); *F21Y 2115/10* (2016.08); *F21Y 2115/15* (2016.08); *H02G 3/123* (2013.01)

(58) Field of Classification Search
CPC ......... F21V 21/04; F21V 17/007; H02G 3/20; H02G 3/16; H02G 3/123; F21S 8/026; F21Y 2115/15; F21Y 2115/10
See application file for complete search history.

(56) References Cited

U.S. PATENT DOCUMENTS

2016/0320007 A1* 11/2016 Araki ..................... F21S 8/026
2017/0307198 A1   10/2017 Shah et al.

\* cited by examiner

INLINE DRIVER MODULE FOR SSL LIGHTING

CROSS-REFERENCE TO RELATED APPLICATIONS

This application claims the benefit of U.S. Provisional Application No. 62/327,221, filed on Apr. 25, 2016, which is hereby incorporated by reference in its entirety.

TECHNICAL FIELD

This disclosure relates to drivers for solid-state lighting ("SSL") sources. More specifically, this disclosure relates to an inline driver module for SSL sources.

BACKGROUND

Many existing household lighting fixtures and commercial lighting fixtures are incandescent light bulb fixtures comprising an Edison screw socket. Incandescent light bulbs operate at very low luminous efficiency compared to solid-state lighting ("SSL") sources, such as light-emitting diodes ("LEDs"), organic light-emitting diodes ("OLEDs"), polymer light-emitting diodes ("PLEDs") and the like. Incandescent light bulbs also have very short lifespans compared to common SSL sources. Because of the benefit of increased power efficiency and bans on traditional incandescent lighting by government bodies in some areas, it can be desirable to convert or retrofit existing incandescent light bulb fixtures to SSL sources without requiring complete replacement of the existing lighting fixture. Additionally, most household, commercial, and industrial lighting is powered with alternating current ("AC") power. SSL sources commonly operate using direct current ("DC") power. It is desirable to produce an inline driver module which can convert AC power to DC power to drive an SSL fixture or retrofit apparatus.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is an inline driver module comprising an input connector, the input connector comprising a live contact and a neutral contact, the live contact configured to connect to a live line of an AC power socket, the neutral contact configured to connect to a neutral line of the AC power socket; an output connector, the output connector comprising a positive contact and a negative contact; and a driver module, the driver module disposed between the input connector and the output connector, the driver module comprising a driver housing and a driver PCB, a driver housing cavity defined within the driver housing, the driver PCB disposed within the driver housing cavity, the driver PCB connected in electrical communication with the live contact, the neutral contact, the positive contact, and the negative contact, the driver PCB configured to convert an AC power input from the AC power socket to a DC power output supplied to the output connector.

Also disclosed is a convertible inline driver module comprising a driver module, the driver module comprising a driver housing, the driver housing define a first driver housing end and a second driver housing end, a driver housing cavity defined within the driver housing, a driver housing opening defined at the second driver housing end; and a driver PCB disposed within the driver housing cavity; the driver PCB configured to convert an AC power input to a DC power output; an input adaptor connected to the first driver housing end, the input adaptor comprising a live contact and a neutral contact both connected in electrical communication with the driver PCB, the live contact configured to connect to a live line of an AC power source, the neutral contact configured to connect to a neutral line of the AC power source; and an output connector cap connected to the second driver housing end, the output connector cap covering the driver housing opening, the output connector cap comprising a positive contact and a negative contact both connected in electrical communication with the driver PCB.

Also disclosed is a retrofit downlight conversion assembly comprising a SSL fixture, the SSL fixture comprising a SSL source and light connector, the SSL source a configured to emit light, the light connector connected in electrical communication with the SSL source; and an inline driver module comprising an input connector configured to connect in electrical communication to an AC power socket; an output connector, the output connector connected in electrical communication with the light connector; and a driver module, the driver module disposed between the input connector and the output connector, the driver module comprising a driver housing and a driver PCB, the driver PCB connected in electrical communication with the input connector and the output connector, the driver PCB configured to convert an AC power input from the AC power socket to a DC power output supplied to the SSL source.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
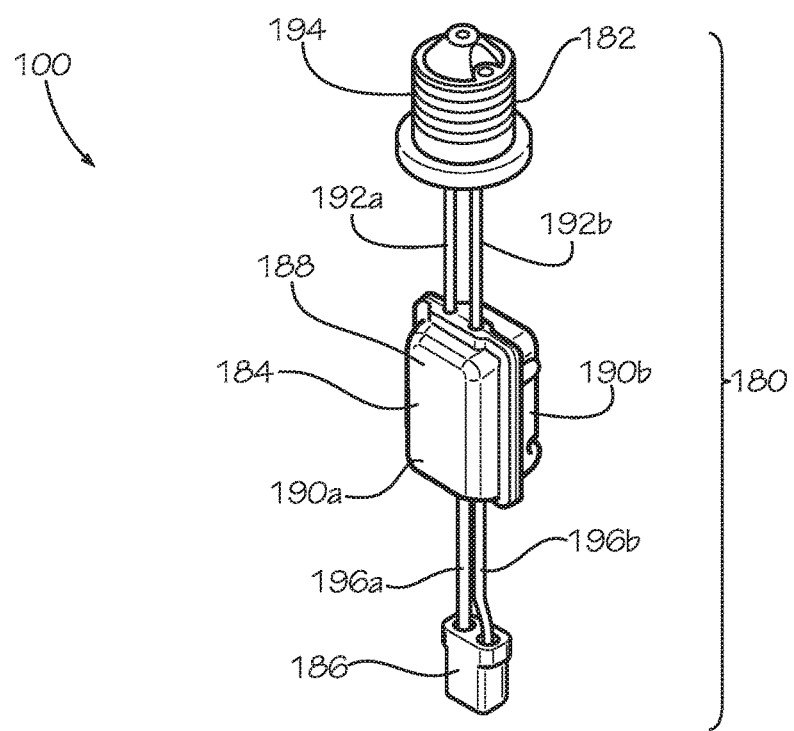
FIG. 1 is a top perspective view of a retrofit downlight conversion assembly comprising an inline driver module and an SSL fixture in accordance with one aspect of the present disclosure.
Figure 1:
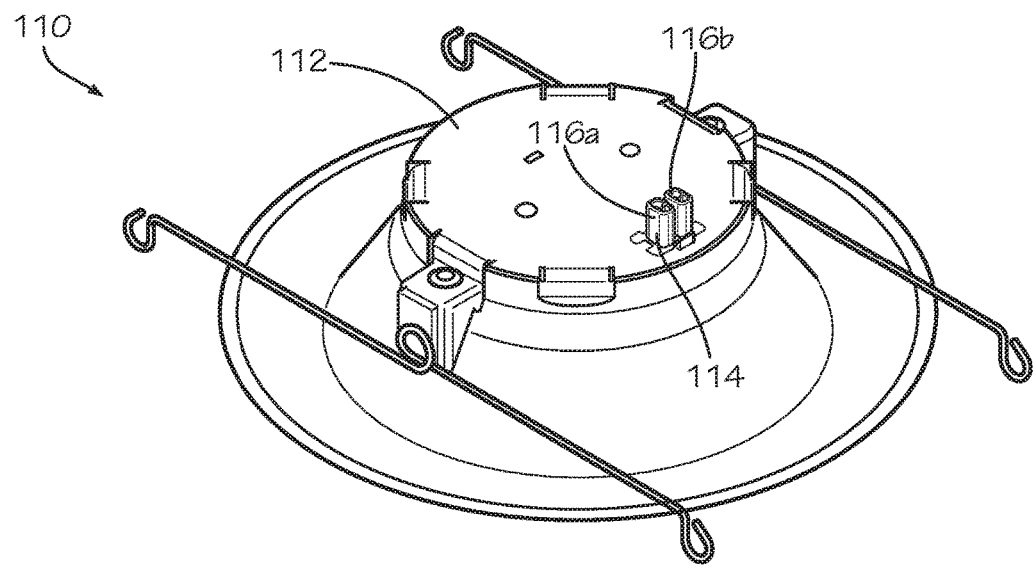

The present disclosure can be understood more readily by reference to the following detailed description, examples, drawings, and claims, and the previous and following description. It is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

According to some aspects, a retrofit downlight conversion assembly is discussed along with associated methods, systems, devices, and various apparatus. The retrofit downlight conversion assembly comprises an SSL fixture and an inline driver module. It would be understood by one of skill in the art that the retrofit downlight conversion assembly is described in but a few exemplary embodiments among many. No particular terminology or description should be considered limiting on the disclosure or the scope of any claims issuing therefrom.

FIG. 1 is a top perspective view of a retrofit downlight conversion assembly 100 comprising an inline driver module 180 and a SSL fixture 110 in accordance with one aspect of the present disclosure. The SSL fixture 110 can comprise an SSL source configured to emit light, such as an LED, PLED, OLED, or any other suitable type of SSL source. In the present aspect, the SSL fixture 110 can be a downlight assembly, and the retrofit downlight conversion assembly 100 can be configured to retrofit a common incandescent downlight fixture (not shown), also called a recessed light, pot light, or can light, to the SSL fixture 110. The downlight assembly should not be viewed as limiting, and the SSL fixture 110 can be any type of light fixture such as a lamp, sconce, chandelier, strip light, track light, or any other suitable light fixture.

The inline driver module 180 can comprise an input connector 182, a driver module 184, and an output connector 186. The driver module 184 can comprise a driver housing 188 and a driver printed circuit board ("PCB") 284 (shown in FIG. 2). In the present aspect, the driver PCB 284 can be a metal-core printed circuit board ("MCPCB"); however in other aspects, the driver PCB 284 can be a different type of PCB. The driver housing 188 can comprise a first shell 190a and a second shell 190b. In the present aspect, the input connector 182 and the output connector 186 can be separated from the driver module 184 such that the input connector 182 and the output connector 186 are not directly structurally attached to the driver module 184.

The input connector 182 can be structurally and electrically connected to the driver module 184 by at least one electrical conductor, such as a cable comprising multiple wires, or a plurality of individual wires. In the present aspect, the input connector 182 can be connected in electrical communication with the driver PCB 284 (shown in FIG. 2) by a first input wire 192a and a second input wire 192b. In the present aspect, the input connector 182 can be an Edison screw plug 194 configured to engage and connect in electrical communication with an Edison screw socket of a common incandescent light fixture (not shown). The Edison screw socket can be an E26 socket under Underwriter Laboratories ("UL") 496 standard, entitled "Lampholders," Sep. 30, 2008 edition as published and maintained by Underwriters Laboratories LLC, headquartered in 333 Pfingsten Road, Northbrook, Ill. 60062, United States of America. In other aspects, the input connector 182 can be a different type of connector, such as a two-blade power plug or a grounded two-blade power plug, such as a NEMA 5-15P, for a wall socket or any other type of suitable electrical connector. In other aspects, the input connector 182 can be a detachable connector such as an International Electrotechnical Commission ("IEC") AC connector which can be detachably connected to the Edison screw plug 194.

The output connector 186 can be structurally and electrically connected to the driver module 184 by at least one electrical conductor, such as a cable comprising multiple wires, or a plurality of individual wires. In the present aspect, the output connector 186 can be connected in electrical communication with the driver PCB 284 (shown in FIG. 2) by a first output wire 196a and a second output wire 196b. In other aspects, the driver PCB 284 can be connected to the output connector 186 by more than two wires, such as if the SSL fixture 110 comprises multiple SSL sources on separate circuits which can be controlled independently. In the present aspect, the output connector 186 can be a 2-pin DC connector, such as an IEC DC connector. In other aspects, the output connector 186 can be a different type of connector, such as a cylindrical connector, a snap-and-lock connector, a Molex connector, a USB connector, or any other suitable type of connector.

The output connector 186 can be configured to connect in electrical communication with a light connector 114 of the SSL fixture 110. In the present aspect, the light connector 114 can be a male connector, and the light connector 114 can extend through a backing plate 112 of the SSL fixture 110. The light connector 114 can comprise a positive extension 116a and a negative extension 116b, and the output connector 186 can be a female connector configured to receive the extensions 116a,b. In other aspects, the output connector 186 can be the male connector, and the light connector 114 can be the female connector. In other aspects, the SSL fixture 110 may not comprise the light connector 114, and the SSL fixture 110 can be directly wired to a stripped end of each of the output wires 196a,b. In such aspects, the inline driver module 180 may not comprise the output connector 186.

Figure 2:
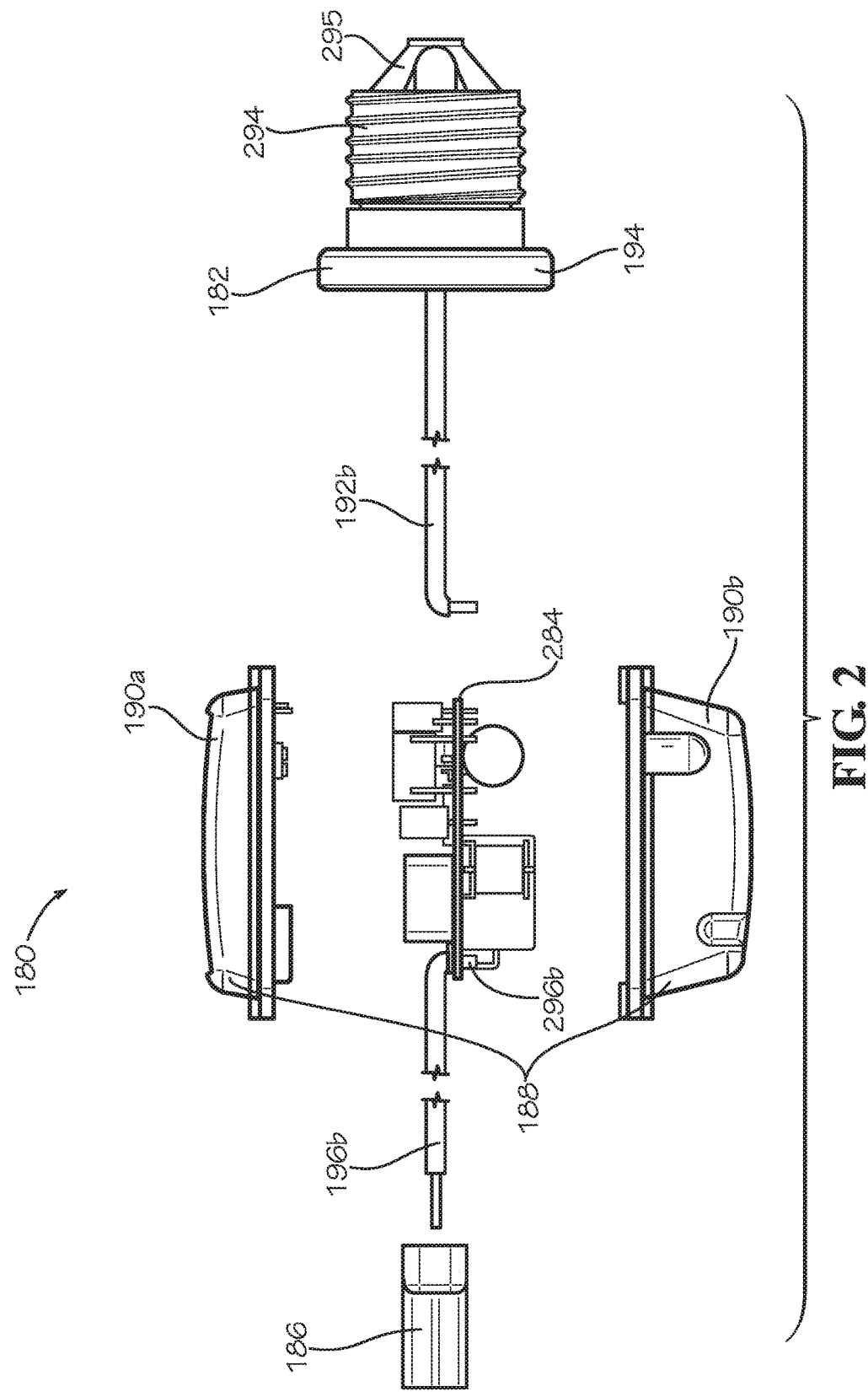
FIG. 2 is an exploded side view of the inline driver module of FIG. 1.

FIG. 2 is an exploded side view of the inline driver module 180 of FIG. 1. The Edison screw plug 194 can define a threaded portion 294 and an end portion 295. The threaded portion 294 can be substantially tubular in shape and can define external threads. The threaded portion 294 can be configured to connect in electrical communication to a neutral line of the AC power socket, such as the Edison screw socket (not shown). The end portion 295 can be substantially frustoconical in shape. The end portion 295 can be configured to connect in electrical communication to a live line of the AC power socket, such as the Edison screw socket (not shown). When connected in electrical communication to the live line and neutral line, the Edison screw plug 194 can receive an AC power input from the AC power socket.

The driver PCB 284 can be an LED driver configured to convert the AC power input from the AC power socket to a DC power output which can be supplied to the output connector 186. The driver PCB 284 can comprise digital logic circuitry to control an output voltage, an output amperage, an output frequency, and an output wave form shape of the DC power output. The AC power input can define an input voltage, and in some aspects, the driver PCB 284 can be configured to boost the output voltage to be great in value than the input voltage. In some aspects, the driver PCB 284 can further comprise a communication module configured to receive a wireless signal. In such aspects, the driver PCB 284 can be remotely controlled, such as by a WiFi signal. For example and without limitation, the driver PCB 284 can be remotely instructed to turn the SSL fixture 110 on or off, to increase or decrease a light output of the SSL fixture 110, or to change a color of light emitted from the SSL fixture 110.

In the present aspect, the output wires 196a,b (the first output wire 196a shown in FIG. 1) can each be connected in electrical communication with the driver PCB 284 by a through board connection 296, as represented by the through board connection 296b of the second output wire 196b. In other aspects, the output wires 196a,b can be connected to the driver PCB 284 by surface mount connections or mechanical connections.

Figure 3:
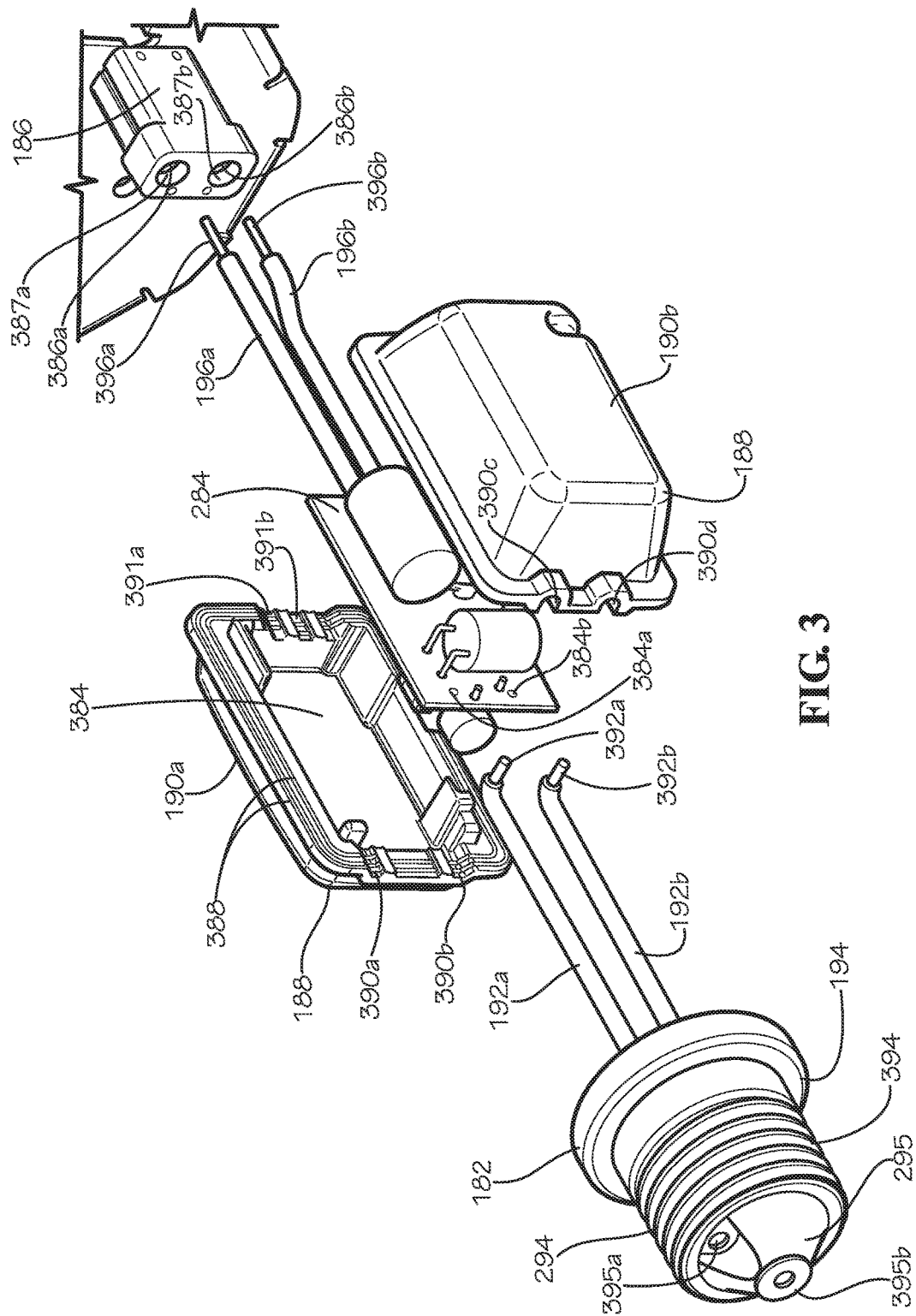
FIG. 3 is an exploded perspective view of the inline driver module of FIG. 1.

FIG. 3 is an exploded perspective view of the inline driver module 180 of FIG. 1. The input wires 192a,b can also be configured to connect to the driver PCB 284 with another pair of through board connections (not shown). The driver PCB 284 can define a first input aperture 384a and a second input aperture 384b. The input apertures 384a,b can be configured to receive a first stripped input wire end 392a and a second stripped input wire end 392b, respectively. With the stripped input wire ends 392a,b extending through the respective input apertures 384a,b, the stripped input wire ends 392a,b can be structurally secured and electrically connected, such as by soldering, to form the through board connections.

A driver housing cavity 384 can be defined within the driver housing 188 by the first shell 190a and the second shell 190b. The driver PCB 284 can be disposed within the driver housing cavity 384. The first shell 190a can define a pair of ridges 388, and the second shell 190b can define a complimentary pair of grooves (not shown) configured to form a seal between the first shell 190a and the second shell 190b, thereby sealing and protecting the driver PCB 284 within the driver housing cavity 384. In some aspects, a sealant, such as silicone, caulking, a gasket, a glue, an epoxy, or other suitable sealant, can be applied between the first shell 190a and the second shell 190b to from the seal.

The first shell 190a and the second shell 190b can define a plurality of input wire grooves 390a,b,c,d. The input wire groove 390a of the first shell 190a can be positioned to align with the input wire groove 390c of the second shell 190b to seal around the first input wire 192a. The input wire groove 390b of the first shell 190a can be positioned to align with the input wire groove 390d of the second shell 190b to seal around the second input wire 192b. The first shell 190a can define a pair of output wire grooves 391a,b configured to align with complimentary output wire grooves (not shown) defined by the second shell 190b to seal around the output wires 196a,b.

In the present aspect, the driver housing 188 can be rated as 5VA flame retardation classification under the UL 94 standard entitled "Standard for Safety of Flammability of Plastic Materials for Parts in Devices and Appliances," Mar. 28, 2013 edition. Under the 5VA flame retardation classification and the UL 1598 standard entitled "Luminaires," Sep. 17, 2008 edition, the first shell 190a and the second shell 190b can comprise 1.5 mm to 2.5 mm thick polybutylene terephthalate ("PBT"), containing 0% to 30% glass fiber, 2.5 mm to 3 mm thick polycarbonate ("PC"), 2.5 mm to 3 mm thick acrylonitrile butadiene styrene ("ABS"), 2 mm to 3 mm thick PC and ABS hybrid plastic, or 2 mm to 3 mm thick ABS and PBT hybrid plastic, for example and without limitation. Under the UL 1993 standard entitled "Self-Ballasted Lamps and Lamp Adapters", Dec. 4, 2012 edition, first shell 190a and the second shell 190b can comprise 0.8 mm to 1.5 mm thick PBT, containing 0% to 30% glass fiber, 1.5 mm thick PC, 1.5 mm to 2.5 mm thick ABS, 1.5 mm to 2.5 mm thick PC and ABS hybrid plastic, or 1.5 mm to 2.5 mm thick ABS and PBT hybrid plastic, for example and without limitation.

In other aspects, the driver housing 188 can comprise other materials. In other aspects, the driver housing 188 can be rated at a different flame retardation classification. In other aspects, the driver housing 188 can comprise overmolded metal wherein a metal sub-frame is coated with a plastic, such as polyethylene, polypropylene, silicon, thermoplastic rubber, thermoplastic elastomers, or any other suitable material. The metal sub-frame can comprise a metal such as aluminum, steel, copper, or any other suitable metal which can be formed by stamping, casting, machining, forging, or any other suitable method of manufacturing. A portion of the metal sub-frame may be left exposed (i.e., not over-molded) in order to dissipate heat from internal components.

In other aspects, the driver housing can comprise two injection molded thermoplastics polymers with either amorphous molecular structure, such as ABS or PC, or semi-crystalline molecular structure, such as nylon or polyester, for example and without limitation. The first shell 190a and the second shell 190b can be joined together with ultrasonic welding, clips, screws, or plastic spot welding, or other suitable methods.

In other aspects, the driver housing 188 can comprise a tubular structure and a pair of end caps defining openings configured to receive the input wires 192a,b and the output wires 196a,b. In other aspects, the driver housing 188 can be a shrink sleeve which can conform to the driver PCB 284, the input wires 192a,b, and the output wires 196a,b. In other aspects, the driver housing 188 can be a one-piece housing defining an opening, and the driver PCB 284 can be sealed within the one-piece housing by potting material.

The input connector 182 can comprise a neutral contact 395a and a live contact 395b. In the present aspect, the neutral contact 395a can be in electrical communication with the end portion 295 of the Edison screw plug 194, and the neutral contact 395a can be in electrical communication with the threaded portion 294 of the Edison screw plug 194. The live contact 395b can be configured to connect in electrical communication to the live line of the AC power socket (not shown), and the neutral contact 395a can be configured to connect in electrical communication to the neutral line of the AC power socket (not shown).

The output connector 186 can comprise a positive contact 386a and a negative contact 386b disposed within a pair of wire receptacles 387a,b defined by the output connector 186. The wire receptacle 387a can be configured to receive a first stripped output wire end 396a of the first output wire 196a and to connect the first output wire 196a in electrical communication with the positive contact 386a. In the present aspect, the first output wire 196a can be a positive output wire defining a positive pole of the DC power output. The wire receptacle 387b can be configured to receive a second stripped output wire end 396b of the second output wire 196b and to connect the second output wire 396b in electrical communication with the negative contact 386b. In the present aspect, the second output wire 196b can be a negative output wire defining a negative pole of the DC power output.

The output connector 186 can be configured to receive the positive extension 116a and the negative extension 116b of the light connector 114 (shown in FIG. 1) when the output connector 186 is structurally and electrically connected to the light connector 114. With the output connector 186 connected to the light connector 114, the positive contact 386a can be connected in electrical communication with the positive extension 116a, and the negative contact 386b can be connected in electrical communication with the negative extension 116b. The output connector 186 can supply the DC power output to the SSL fixture 110.

Figure 4:
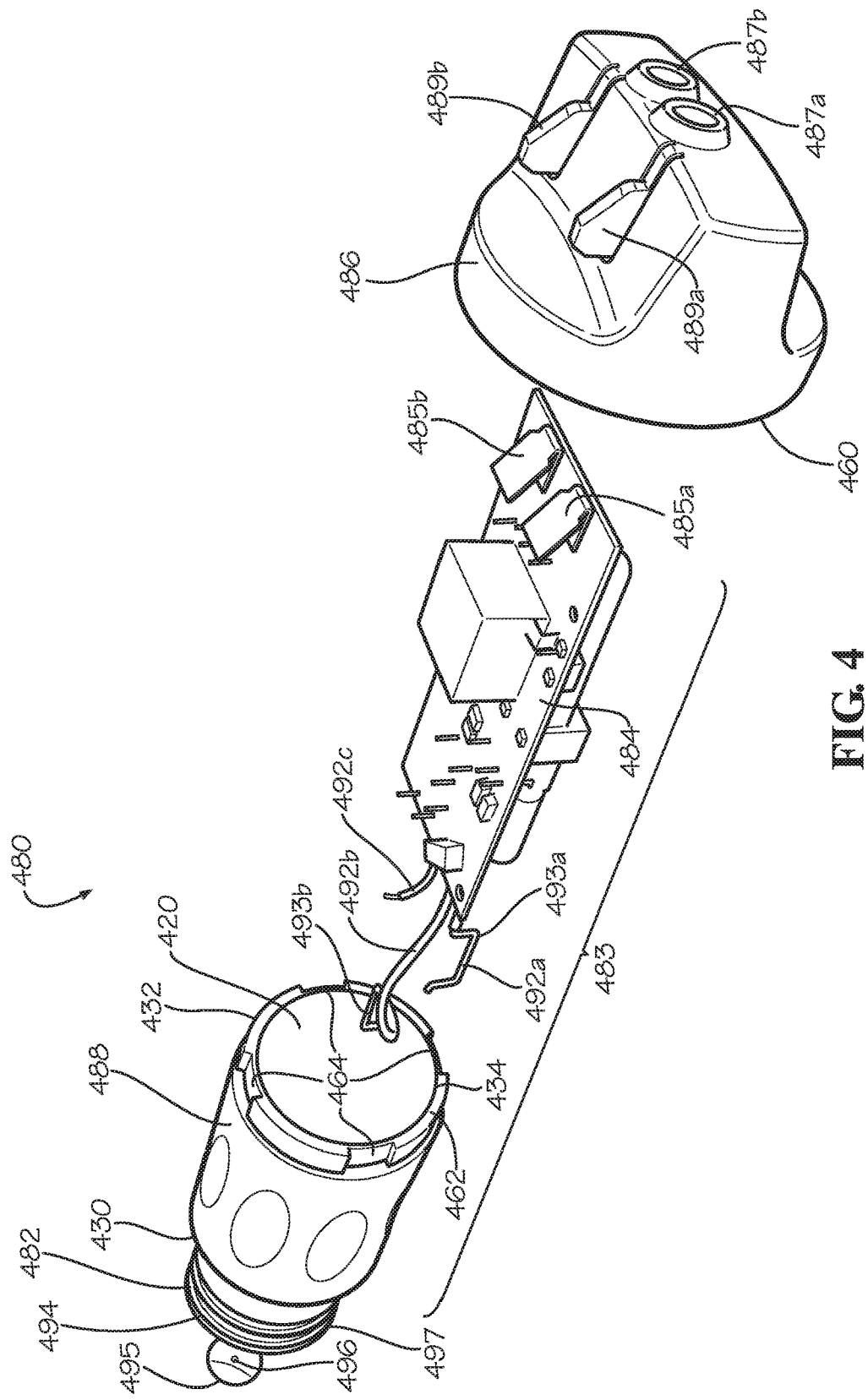
FIG. 4 is an exploded perspective view of a convertible inline driver module comprising one aspect of an input adaptor in accordance with another aspect of the present disclosure.

FIG. 4 is an exploded perspective view of another aspect of the inline driver module in accordance with another aspect of the present disclosure. In the present aspect, the inline driver module can be a convertible inline driver module 480. The convertible inline driver module 480 can comprise a driver module 483, an input adaptor 494, and an output connector cap 486. The driver module 483 can comprise a driver housing 488 and a driver PCB 484. The driver PCB 484 can be another aspect of the driver PCB 284; however, the driver PCB 484 can comprise a pair of output spring contacts 485a,b which can be surface mounted to the driver PCB 484.

For UL 1598, the driver housing 488 can comprise a thermoplastic polymer, for example and without limitation 2.5 mm to 3 mm thick PC, 1.5 mm to 2.5 mm thick PBT containing 0% to 30% glass fiber, 2.5 mm to 3 mm thick ABS, 2 mm to 3 mm thick PC and ABS hybrid plastic, or 2 mm to 3 mm thick PC and PBT hybrid plastic, with a flame retardation classification of 5VA under UL 94. For UL 1598, the output connector cap 486 can comprise a thermoplastic polymer, for example and without limitation 2.5 mm to 3 mm thick PC, 1.5 mm to 2.5 mm thick PBT containing 0% to 30% glass fiber, 2.5 mm to 3 mm thick ABS, 2 mm to 3 mm thick PC and ABS hybrid plastic, or 2 mm to 3 mm thick PC and PBT hybrid plastic, with a flame retardation classification of 5VA under UL 94.

The driver housing 488 can define a first driver housing end 430 and a second driver housing end 432. The first driver housing end 430 can be disposed opposite from the second driver housing end 432. A driver housing cavity 420 can be defined within the driver housing 188, and a driver housing opening 434 can be defined at the second driver housing end 432. In the present aspect, the driver housing 488 can define an attachment collar 462 at the second driver housing end 432, and the attachment collar 462 can define a plurality of indexing notches 464 equally spaced around a circumference of the attachment collar 462.

The input adaptor 482 can be connected to the first driver housing end 430. The input adaptor 482 can comprise a phenolic plastic, such as Bakelite for example and without limitation. In the present aspect, the input adaptor 482 can be an Edison screw cap 494. The Edison screw cap 494 can fit over the first driver housing end 430. The Edison screw cap 494 can define a threaded portion 497 and an end portion 495. The threaded portion 497 can be substantially tubular in shape and can define external threads. The threaded portion 497 can be configured to connect in electrical communication to the neutral line of the AC power socket, such as the Edison screw socket (not shown). The end portion 495 can be substantially frustoconical in shape. The end portion 495 can be configured to connect in electrical communication to the live line of the AC power socket, such as the Edison screw socket (not shown). When connected to the live line and neutral line, the Edison screw plug can receive the AC power input from the AC power socket.

The Edison screw cap 494 is only one example of an input adaptor 482, and the input adaptor 482 of the convertible inline driver module 480 can be interchanged with other input adaptors 482 configured to adapt the convertible inline driver module 480 to connect with other types of AC power sockets. For example and without limitation, in some aspects the input adaptor 482 can be a two-blade power plug (not shown) configured to connect in electronic communication with a wall socket. In some aspects, the input adaptor 482 can be permanently attached to the driver housing 488; however, in other aspects, the input adaptor 482 can be detachable and interchangeable. In other aspects, the input adaptor 482 can be integrally formed with the driver housing 488.

The input adaptor 482 can comprise a neutral contact 493a and a live contact 493b. The neutral contact 493a and the live contact 493b can be connected in electrical communication to the driver PCB 484. In the present aspect, the neutral contact 493a can be defined by a stripped end of a first input wire 492a. The stripped end of the first input wire 492a can be shaped to extend through the threaded portion 497 of the Edison screw cap 494. The live contact 493b can be defined by a stripped end of a second input wire 492b. The stripped end of the second input wire 492b can extend through an end opening 496 defined by the end portion 495 when the convertible inline driver module 480 is in an assembled configuration. In the assembled configuration, a grounding contact 492c can also connect the input adaptor 482 in electrical communication with the driver PCB 484 to ground the driver PCB 484. In other aspects, the input adaptor 482 can comprise a separate neutral contact and live contact, and the input wires 492a,b can be connected in electrical communication to the respective contacts.

In the assembled configuration, the driver PCB 484 can be positioned within the driver housing cavity 420, and the output connector cap 486 can be connected to the second driver housing end 432. In the assembled configuration, the output connector cap 486 can cover the driver housing opening 434 and enclose the driver housing cavity 420. The output connector cap 486 can define a lip 460 configured to fit over and engage the attachment collar 462. The lip 460 can engage the indexing notches 464 to prevent rotation of the output connector cap 486 relative to the driver housing 488.

The output connector cap 486 can define a pair of wire receptacles 487a,b and a pair of receptacle tabs 489a,b. The output spring contacts 485a,b can extend away from the driver PCB 484 in an uncompressed state. In the assembled configuration, the output spring contacts 485a,b can occlude the wire receptacles 487a,b, respectively. The receptacle tabs 489a,b can respectively engage the output spring contacts 485a,b, and depressing the receptacle tabs 489a,b can position the respective output spring contact 485a,b in a compressed state in which the respective wire receptacle 487a,b is uncovered. With the output spring contacts 485a,b in the compressed state, a stripped end of an output wire (not shown) can be inserted into a one of the wire receptacles 487a,b. In some aspects, the output wires can be stabbed into the wire receptacles 487a,b without depressing the receptacle tabs 489a,b. In the present aspect, the wire receptacles 487a,b can be configured to receive the output wire from 22 American Wire Gauge ("AWG") to 18AWG in thickness.

Releasing the receptacle tabs 489a,b can return the output spring contacts 485a,b to the uncompressed state wherein the output spring contacts 485a,b can engage the stripped ends of the output wires to connect in electrical communication with the respective output wire. The receptacle tabs 489a,b can be depressed to remove the output wires from the wire receptacles 487a,b. In the present aspect, the output spring contact 485a can be a positive contact, and the output spring contact 485b can be a negative contact. In the present aspect, the output spring contacts 485a,b can comprise plated copper and can be surface mounted to the driver PCB 484.

The output wires can structurally and electrically connect the output connector cap 486 to the light connector 114 (shown in FIG. 1). In some aspects, stripped ends of the output wires (not shown) can be directly wired to the SSL fixture 110 (shown in FIG. 1); however, in other aspects, the output wires can be connected in electrical communication with an output connector, similar to the output connector 186 of FIG. 1.

In other aspects, the output wires can be wired directly to the driver PCB 484, such as with a through board or surface mount connection. In other aspects, the output connector cap 486 can comprise a detachable DC connector, similar to the output connect 186 or the light connector 114 (shown in FIG. 1).

Figure 5:
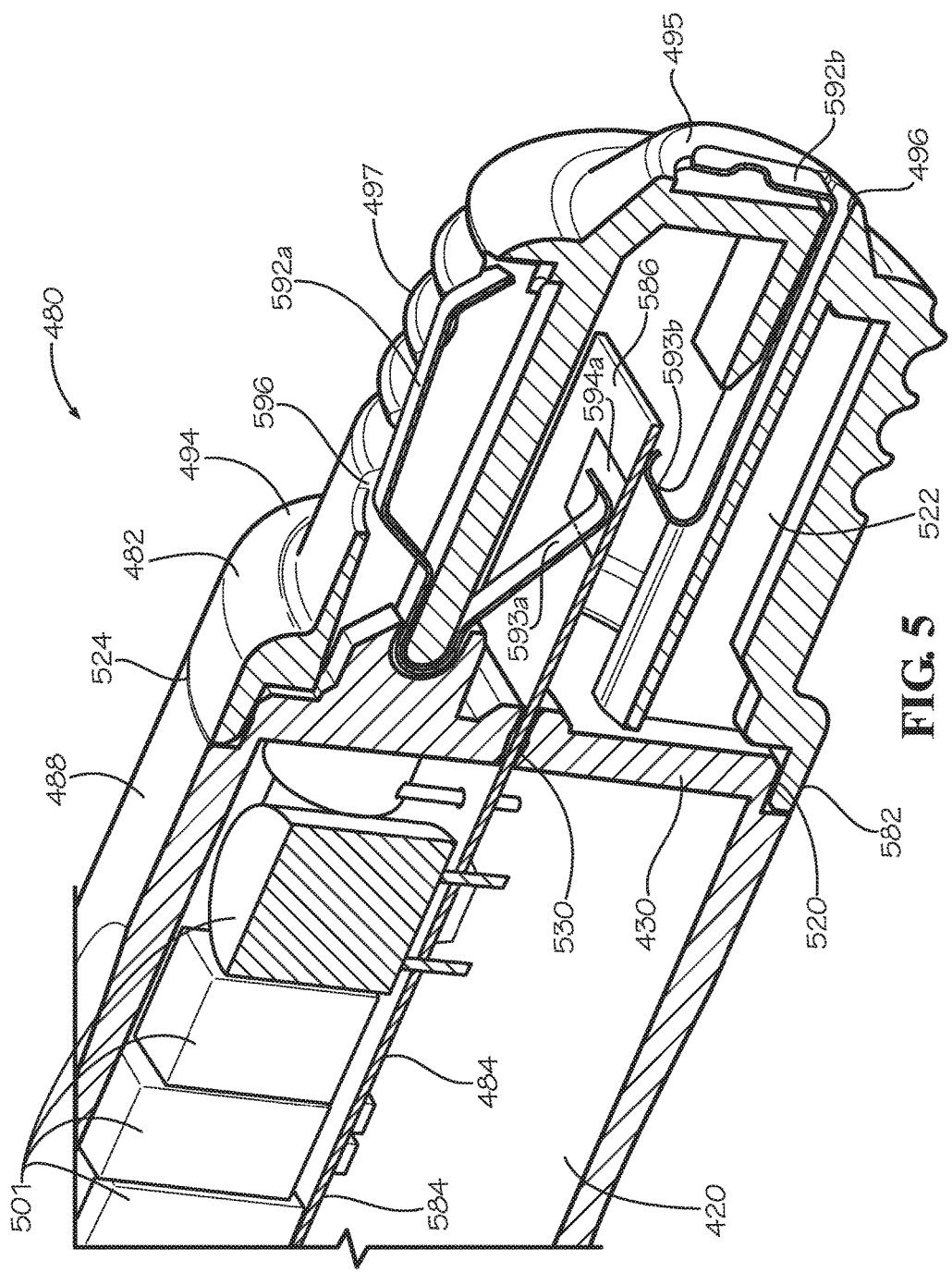
FIG. 5 is a cross-section of another aspect of the input adaptor in accordance with another aspect of the present disclosure.

FIG. 5 is a cross-section of another aspect of the input adaptor 482 comprising input spring contacts 592a,b in place of the input wires 493a,b. The input spring contacts 592a,b can comprise plated copper or another suitable conductive material. The input adaptor 482 can define an input adaptor cavity 522 within the input adaptor 482. The input adaptor 482 can define a input adaptor opening 524 to the input adaptor cavity 522 disposed opposite from the end portion 495 of the input adaptor 482. The input adaptor 582 can define an adaptor lip 582 extending around the adaptor opening 524 which can engage a circumferential housing groove 520 defined at the first driver housing end 430 to attach the input adaptor 582 to the driver housing 488. In the present aspect, the adaptor lip 582 can be sized to provide a friction fit with the circumferential housing groove 520; however in other aspects, the adaptor lip 582 can be attached to the circumferential housing groove 520 by an adhesive such as a glue, an epoxy, a cement, or other suitable material or by a mechanical mechanism such as threading.

With the input adaptor 582 attached to the first driver housing end 430 of the input adaptor 482, the first end 430 of the driver housing 488 can cover the input adaptor opening 524 and enclose the input adaptor cavity 522. The first driver housing end 430 can define a PCB slot 530 shaped and sized complimentary to the driver PCB 484 and extending through the first driver housing end 430. The driver PCB 484 can define a first portion 584 and a second portion 586. The second portion 586 of the driver PCB 484 can extend through the PCB slot 530, and the input adaptor cavity 522 can receive the second portion 586 of the driver PCB 484.

The driver PCB 484 can comprise a plurality of electrical components 501, such as resistors, capacitors, inductors, op amps, transistors, and processors, for example and without limitation. The plurality of electrical components 501 can be disposed on the first portion 584 of the driver PCB 484 within the driver housing cavity 480 and external to the input adaptor cavity 522. The second portion 586 of the driver PCB 484 can comprise a pair of contact pads 594, as represented by a neutral contact pad 594a. The live contact pad (not shown) can be disposed on an opposite side of the driver PCB 484 from the neutral contact pad 594a. The contact pads 594 can be surface mount contacts in the present aspect.

A neutral input spring contact 592a of the input spring contacts 592a,b can be configured to extend through a slot 596 defined extending through the threaded portion 497 of the input adaptor 582. The neutral input spring contact 592a can comprise a neutral spring arm 593a which can be biased to engage the neutral contact pad 594a, thereby connecting the neutral input spring contact 592a in electrical communication with the driver PCB 484. A live input spring contact 592b of the input spring contacts 592a,b can extend through the end opening 496 of the end portion 495. The live input spring contact 592b can comprise a live spring arm 593b which can be biased to engage the live contact pad (not shown) to connect the live input spring contact 592b in electrical communication with the driver PCB 484. The spring arms 593a,b can facilitate assembly of the convertible inline driver module 480 by obviating the need for soldering or other electrical connection processes.

Figure 6:
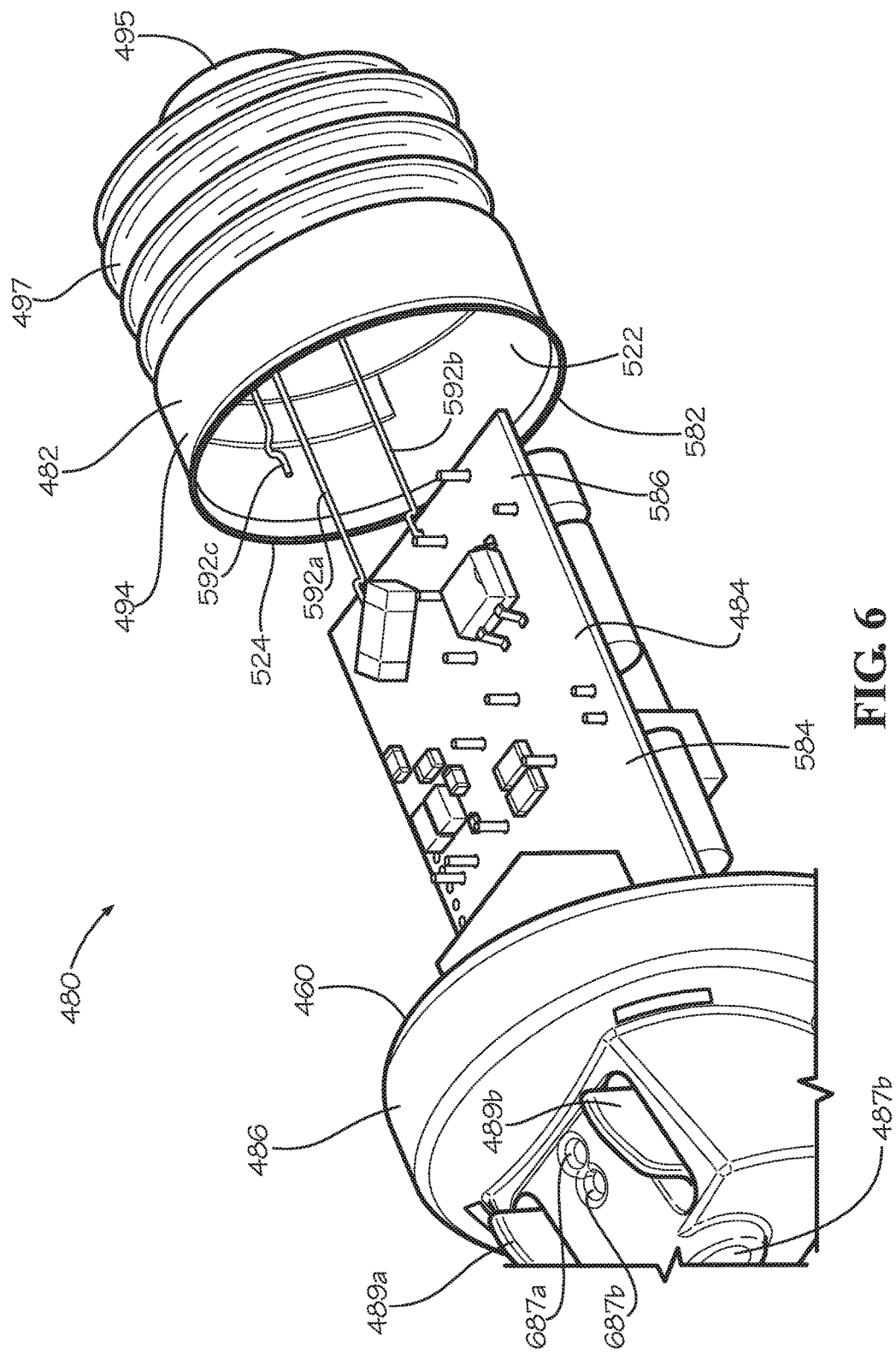
FIG. 6 is an exploded perspective view of another aspect of the convertible inline driver module in accordance with another aspect of the present disclosure.

FIG. 6 is an exploded perspective view of another aspect of the convertible inline driver module 480 wherein the convertible inline driver module 480 does not comprise the driver housing 488. In the present aspect, the input adaptor 482 can structurally attach directly to the output connector cap 486. The lip 460 of the output connector cap 486 can receive the collar 582 of the input adaptor 482. The first portion 584 of the driver PCB 484 can be received by an output connector cap cavity (not shown) defined within the output connector cap 486. The second portion 586 can be received within the input adaptor cavity 522. In some aspects, the output connector cap 486 can comprise a plurality of programming ports 687a,b which can be configured to connect a computer to the driver PCB 484 in order to program the driver PCB 484. For example and without limitation, the driver PCB 484 can be programmed to turn the SSL fixture 110 (shown in FIG. 1) on or off at set times or to adjust light output from the SSL fixture 110 throughout the day.

The output connector cap 486 can receive a pair of output wires as similarly described relative to FIG. 5 above. The output wires can structurally and electrically connect the output connector cap 486 to the light connector 114 (shown in FIG. 1). In some aspects, stripped ends of the output wires (not shown) can be directly wired to the SSL fixture 110 (shown in FIG. 1); however, in other aspects, the output wires can be connected in electrical communication with an output connector, similar to the output connector 186 of FIG. 1, which can connect to the light connector 114 of the SSL fixture 110 (shown in FIG. 1). In other aspects, the output wires can be wired directly to the driver PCB 484, such as with a through board or surface mount connection. In other aspects, the output connector cap 486 can comprise a detachable DC connector, similar to the output connect 186 or the light connector 114 (shown in FIG. 1).

In the present aspect, the input adaptor 482 can be the Edison screw cap 494, and the Edison screw cap 494 can comprise a metal. The neutral contact 592a can be connected in electrical communication with the threaded portion 497 of the Edison screw cap 494, and the live contact 592b can be connected in electrical communication with the end portion 495 of the Edison screw cap 494. The input adaptor 482 can further comprise a grounding contact 592c which can be attached to the driver PCB 484 or the output connector cap 486 to provide grounding for the convertible inline driver module 480.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An inline driver module comprising:
an input connector, the input connector comprising a live contact and a neutral contact, the live contact configured to connect to a live line of an AC power socket, the neutral contact configured to connect to a neutral line of the AC power socket;
an output connector, the output connector comprising a positive contact and a negative contact; and
a driver module, the driver module disposed between the input connector and the output connector, the driver module comprising a driver housing and a driver PCB, a driver housing cavity defined within the driver housing, the driver PCB disposed within the driver housing cavity, the driver PCB connected in electrical communication with the live contact, the neutral contact, the positive contact, and the negative contact, the driver PCB configured to convert an AC power input from the AC power socket to a DC power output supplied to the output connector, wherein the AC power input defines an input voltage and the DC power output defines an output voltage, wherein the driver PCB is configured to control the output voltage to be greater in value than the input voltage.

2. The inline driver module of claim 1, wherein:
the input connector is separated from the driver housing; and
the input connector is connected to the driver housing by a first electrical conductor.

3. The inline driver module of claim 1, wherein the input connector is an Edison screw plug, and wherein the AC power socket is an Edison screw socket.

4. The inline driver module of claim 1, wherein:
the driver housing comprises a first shell and a second shell; and
the first shell is attached to the second shell to enclose the driver housing cavity.

5. The inline driver module of claim 1, wherein:
the output connector is connected to a light connector of an SSL fixture; and the driver PCB is configured to control light emission from the SSL fixture.

6. The inline driver module of claim 5, wherein the driver PCB comprises an antenna configured to receive a wireless signal.

7. A convertible inline driver module comprising:
a driver module, the driver module comprising:
a driver housing, the driver housing define a first driver housing end and a second driver housing end, a driver housing cavity defined within the driver housing, a driver housing opening defined at the second driver housing end; and
a driver PCB disposed within the driver housing cavity; the driver PCB configured to convert an AC power input to a DC power output;
an input adaptor connected to the first driver housing end, the input adaptor comprising a live contact and a neutral contact both connected in electrical communication with the driver PCB, the live contact configured to connect to a live line of an AC power source, the neutral contact configured to connect to a neutral line of the AC power source; and
an output connector cap connected to the second driver housing end, the output connector cap covering the driver housing opening, the output connector cap comprising a positive contact and a negative contact both connected in electrical communication with the driver PCB.

8. The convertible inline driver module of claim 7, wherein:
a first portion of the driver PCB is disposed within the driver housing cavity;
a second portion of the driver PCB extends through the first driver housing end; the input adaptor defines an input adaptor cavity; and
the input adaptor cavity receives the second portion of the driver PCB.

9. The convertible inline driver module of claim 8, wherein:
the first driver housing end defines a PCB slot shaped and sized complimentary to the driver PCB; and
the driver PCB extends through the PCB slot.

10. The convertible inline driver module of claim 8, wherein:
the neutral contact comprises a neutral spring arm;
the driver PCB comprises a neutral contact pad disposed on the second portion; and
the neutral spring arm engages the neutral contact pad.

11. The convertible inline driver module of claim 7, wherein the input adaptor is an Edison screw cap.

12. The convertible inline driver module of claim 11, wherein:
the Edison screw cap defines a threaded portion and an end portion;
the live contact extends through the end portion of the Edison screw cap; and
the neutral contact extends through the threaded portion of the Edison screw cap.

13. The convertible inline driver module of claim 7, wherein:
the output connector cap comprises a positive wire connector configured to receive a stripped end of a positive wire;
the output connector cap comprises a negative wire connector configured to receive a stripped end of a negative wire;
the positive contact is connected in electrical communication with the positive wire connector; and
the negative contact is connected in electrical communication with the negative wire connector.

14. The convertible inline driver module of claim 7, wherein the input adaptor is integrally formed with the driver housing.

15. A retrofit downlight conversion assembly comprising:
a SSL fixture, the SSL fixture comprising a SSL source and light connector, the SSL source a configured to emit light, the light connector connected in electrical communication with the SSL source; and
an inline driver module comprising:
an input connector configured to connect in electrical communication to an AC power socket;
an output connector, the output connector connected in electrical communication with the light connector; and
a driver module, the driver module disposed between the input connector and the output connector, the driver module comprising a driver housing and a driver PCB, the driver PCB connected in electrical communication with the input connector and the output connector, the driver PCB configured to convert an AC power input from the AC power socket to a DC power output supplied to the SSL source, wherein the AC power input defines an input voltage and the DC power output defines an output voltage, wherein the driver PCB is configured to control the output voltage to be greater in value than the input voltage.

16. The retrofit downlight conversion assembly of claim 15, wherein: the AC power socket is an Edison screw socket; and the input connector is an Edison screw plug.

17. The retrofit downlight conversion assembly of claim 15, wherein: the driver housing defines a driver housing cavity; and at least a portion of the driver PCB is disposed within the driver housing cavity.

18. The retrofit downlight conversion assembly of claim 15, wherein: the input connector is separated from the driver module; and at least one electrical conductor structurally and electrically connects the driver module to the input connector.

19. The retrofit downlight conversion assembly of claim 15, wherein the output connector is structurally and electrically connected to the light connector by an output wire.

* * * * *